Oct. 17, 1961     A. B. BOYD     3,005,169

FREQUENCY SELECTIVE CIRCUIT

Filed Nov. 29, 1957

INVENTOR.
A. Benrose Boyd
BY
E. W. Christie
ATTORNEY ical impedance varies
3,005,169
FREQUENCY SELECTIVE CIRCUIT Anderson Bemrose Boyd, Milwaukee, Wis., assignor to General Motors Corporation, Detroit, Mich., a corporation of Delaware
Filed Nov. 29, 1957, Ser. No. 699,771
1 Claim. (Cl. 333—71)

This invention relates to frequency selective circuits of the type using a mechanically resonant member for determining the selected frequency.

Frequency selective circuits have been devised in which a vibratile element operates in conjunction with a single coil which serves to drive the vibratile element and acts as variable impedance in the circuit. The magnitude of the impedance is a function of the frequency of the current energizing the coil and provides a selectivity characteristic corresponding to that of the vibratile element. When this arrangement is connected as one arm of a bridge, the circuit affords excellent frequency stability with a very high "Q" or selectivity but at frequencies removed from the resonant frequency the attenuation approaches a constant limiting value. Additionally, the sensitivity is limited and a balancing coil is required in the bridge circuit.

In accordance with this invention, these difficulties are obviated by utilizing the phenomena of motional impedance to provide push-pull action in a bridge circuit. This is accomplished by the arrangement of coils in adjacent arms of the bridge so as to provide a common field in which a single, mechanically resonant element may vibrate. In addition to increased sensitivity, this arrangement also provides attenuation which approaches an infinite value at frequencies remote from the resonant frequency.

A more complete understanding of this invention may be had from the detailed description which follows taken with the accompanying drawings in which.

Figure 1:
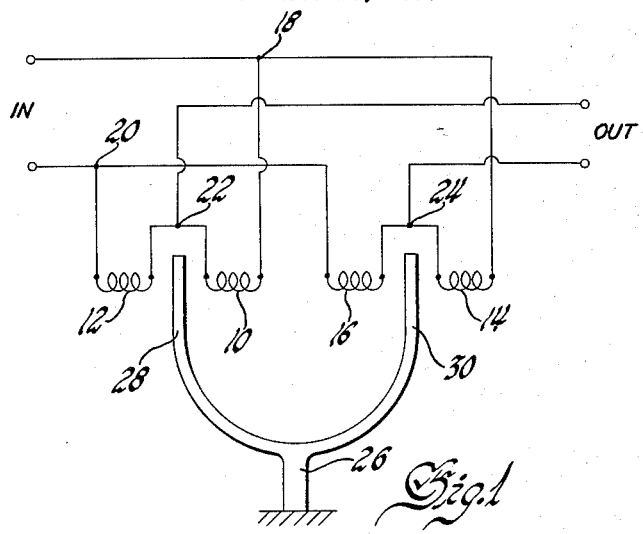
FIGURE 1 is a schematic diagram of the frequency selective circuit.
Figure 2:
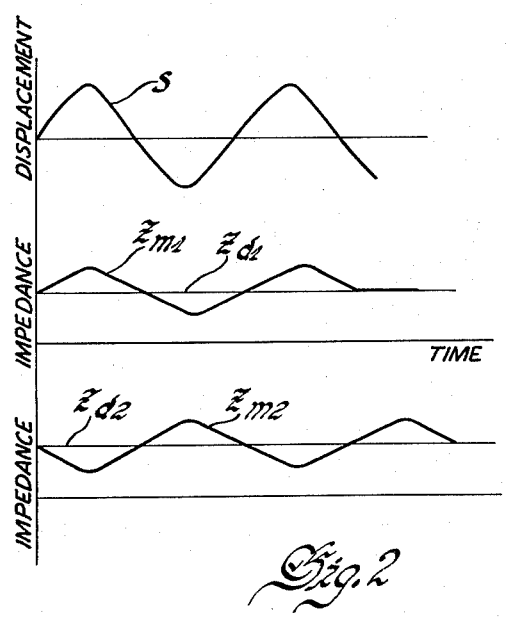
FIGURE 2 shows the phase relationship of variations in displacement and impedances in the system.

Referring now to the drawings, there is shown in FIGURE 1 an illustrative embodiment of the invention in a frequency selective circuit of general application. The circuit comprises a bridge having a pair of inductance coils 10 and 12 connected serially between the terminals 18 and 20 and forming one pair of conjugate arms of the bridge. Similarly, a pair of coils 14 and 16 are connected serially between the terminals 18 and 20 and form the other pair of conjugate arms of the bridge. The diagonally opposite terminals 18 and 20 connected to the input terminals are adapted to receive an input signal voltage. The remaining pair of diagonally opposite terminals 22 and 24 are connected to the output terminals of the bridge and are adapted to be connected to any suitable utilization device.

The pair of coils 10 and 12 in one pair of conjugate arms are structurally arranged adjacent each other to provide a common magnetic field therebetween. Similarly, the coils 14 and 16 are arranged to provide a common magnetic field. A mechanically resonant member such as a tuning fork 26 has a vibratile portion or tine 28 disposed intermediate coils 10 and 12 in the common magnetic field thereof. Similarly, a vibratile portion or tine 30 is disposed intermediate coils 14 and 16 in the common magnetic field thereof.

In the circuit just described, the frequency determining element is the mechanically resonant member 26 which in this illustrative embodiment takes the form of a tuning fork. In such mechanically resonant members it is well known that the mechanical impedance varies as a function of frequency in a manner similar to that of a series resonant circuit constituted of inductance, capacitance and resistance. At the resonant frequency the impedance is at a minimum value and at frequencies above and below resonance the impedance increases rapidly. As will appear hereinafter, the selectivity of the bridge circuit is determined by the selectivity of the mechanically resonant member. It will also appear that the mechanically resonant member may take various forms equivalent to the well known tuning fork such as vibratory reeds, and rotary or torsionally vibratile members.

When a mechanically resonant member is subjected to the magnetic field of a coil energized with an alternating current the impedance of the coil may be treated as having two components. One component is the damped impedance which has a value equal to the impedance of the coil with the mechanically resonant member at rest in its reference position. The other component is the motional impedance which is developed by virtue of the motion of the mechanically resonant member in the magnetic field of the coil. The motional impedance component may be considered to be alternating at the frequency of vibration of the resonant member and effectively causes the total impedance of the coil to vary as a function of time about the damped impedance value. The motional impedance component is developed from the self-induction variation of the coil resulting from the positional variation of the resonant member in the magnetic field of the coil. It will be appreciated that the instantaneous value of the inductance of the coil is smaller or greater than that corresponding to the damped impedance depending upon whether the resonant member is displaced from the coil more or less than the reference position.

The operation of the inventive system will be explained in a nonrigorous fashion by considering the relationship of positional variation of vibratile element 28 to the impedance variation in the single pair of coils 10 and 12. With the element 28 at rest in its reference position, the coil 10 has a constant value of impedance or a damped impedance value $Z_{d1}$ and the coil 12 has damped impedance of constant value $Z_{d2}$. When the coils 10 and 12 are energized with an alternating current at the resonant frequency of the vibratile element 28, the positional variation is represented by the curve S which illustrates the displacement from the reference position as being a sinusoidal function of time. As the vibratile element 28 approaches and departs from the coil 10 during its first half cycle of motion, the instantaneous value of inductance and the motional impedance component $Z_{m1}$ increases from zero to a positive maximum value and then decreases to zero. As indicated, the motional impedance value is added algebraically to the damped impedance value. During the next half cycle, the motional impedance component $Z_{m1}$ varies from zero value through a negative maximum value with the positional variation of the vibratile element 28 on the other side of the reference position. The instantaneous value of inductance and motional impedance $Z_{m2}$ of the coil 12 is varied by the positional variation of the vibratile element 28 in the same manner but in opposite phase as represented by the motional impedance curve $Z_{m2}$.

When a signal voltage, applied to the input terminals, is remote from the resonant frequency, the vibratile elements 28 and 30 are at rest in their reference positions, all of the coils have equal values of damped impedances and, accordingly, the bridge circuit is balanced. Under this condition of operation the voltage appearing at the output circuit is sensibly zero. When the voltage applied to the input terminals has a frequency equal to the resonant frequency, the motional impedance components of the impedance presented by coils 10 and 12 vary in opposite phase and, accordingly, the bridge is unbalanced. Similarly, the motional impedance components of the coils 14 and 16 vary in opposite phase contributing further to the unbalance of the bridge. Thus, the input signal voltage is translated by the bridge circuit with little attenuation and a large output voltage appears at the output terminals. It will be understood that the displacement of the vibratile elements 28 and 30 should be properly phased so that the unbalance effect on the bridge circuit is cumulative. Thus the displacement of vibratile element 28 relative to the coil 12 should be in phase agreement with the displacement of the vibratile element 30 relative to the coil 14 causing the motional impedance components of the opposite arm coils to be in phase agreement. The initial conditions of the circuit may be established to ensure the desired phase relation by any suitable means depending upon the specific form of the resonant member. For example, in the case of the tuning fork arrangement, the coils 12 and 14 may be provided with somewhat fewer coil turns but in slightly closer proximity to the respective vibratile elements 28 and 30. This arrangement will provide coils 10 and 14 and coils 12 and 16 with equal values of damped impedance to balance the bridge in the static condition and will ensure that the motions of vibratile elements 28 and 30 are properly phased by unbalancing the initial magnetic force in favor of coils 12 and 14. In the case of other mechanically resonant members the vibratile elements may be mechanically interconnected or otherwise constrained to move in the proper phase relationship.

Figure 3:
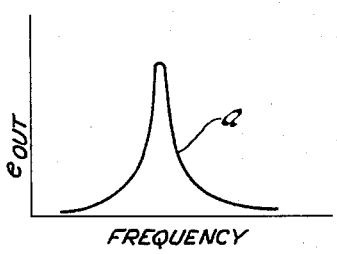
FIGURE 3 is a response curve of a typical circuit.

As shown by the response curve of FIGURE 3 for an input signal voltage of given amplitude, the output voltage varies as a function of frequency with a peak response at the resonance of the vibratile elements. As the input frequency decreases or increases from resonance, the output voltage decreases sharply and approaches the zero value in an asymptotic manner. Numerous applications of the circuit having this characteristic will be apparent. The most obvious example is a simple frequency selective filter in which only the frequency of resonance is translated from the input terminals to the output terminals. The circuit may also be used as the frequency determining component in an oscillator wherein the subject bridge circuit is connected to supply regenerative feedback. Similarly, a highly selective frequency rejection circuit may be realized by connecting the bridge circuit in the degenerative feedback path of an amplifier.

Although this invention has been described with respect to a particular embodiment, such description is not to be construed in a limiting sense. Numerous modifications and variations within the spirit and scope of the invention will now occur to those skilled in the art. For a definition of the invention, reference is made to the appended claim.

I claim:

A frequency selective circuit comprising a bridge including an inductance coil in each arm of the bridge, one pair of diagonally opposite terminals of the bridge constituting input terminals, a first pair of said coils being disposed adjacent each other to provide a first common field and connected in series between the input terminals, a vibratile element located in the first common field, a second pair of said coils being disposed adjacent each other to provide a second common field and connected in series between the input terminals, a vibratile element located in the second common field, said vibratile elements being mechanically resonant at a selected frequency whereby the motional impedances of the coils of the first said pair vary in opposite phase and the motional impedances of the coils of the second said pair vary in opposite phase, said vibratile elements being in motional phase agreement with each other relative to the coils in diagonally opposite arms of the bridge circuit, the other pair of diagonally opposite terminals of the bridge constituting output terminals.

References Cited in the file of this patent

UNITED STATES PATENTS

| | | |
|---|---|---|
| 1,821,181 | Gunn | Sept. 1, 1931 |
| 2,160,876 | Lakatos | June 6, 1939 |
| 2,630,482 | Bostwick | Mar. 3, 1953 |
| 2,660,712 | Landon | Nov. 24, 1953 |

OTHER REFERENCES

"A Band-Pass Mechanical Filter for 100 Kc.," Article in R.C.A. Review, pages 34–46, March 1952.